United States Patent
Tseng et al.

(10) Patent No.: US 12,378,952 B1
(45) Date of Patent: Aug. 5, 2025

(54) ACTUATION APPARATUS AND ACTUATION METHOD

(71) Applicant: Luxshare Intelligent Manufacture Technology (Changshu) Co., Ltd, Changshu (CN)

(72) Inventors: Po-Ying Tseng, Changshu (CN); Kai-Jing Fu, Changshu (CN)

(73) Assignee: Luxshare Intelligent Manufacture Technology (Changshu) Co., Ltd, Changshu (CN)

( * ) Notice: Subject to any disclaimer, the term of this patent is extended or adjusted under 35 U.S.C. 154(b) by 0 days.

(21) Appl. No.: 18/929,777

(22) Filed: Oct. 29, 2024

(30) Foreign Application Priority Data

Jun. 21, 2024 (CN) .......................... 202410808464.9

(51) Int. Cl.
*F03G 7/06* (2006.01)
(52) U.S. Cl.
CPC ........... *F03G 7/06143* (2021.08); *F03G 7/06* (2013.01); *F03G 7/061* (2021.08); *F03G 7/06114* (2021.08)
(58) Field of Classification Search
CPC ........ F03G 7/06143; F03G 7/06; F03G 7/061; F03G 7/06114
See application file for complete search history.

(56) References Cited

U.S. PATENT DOCUMENTS

| | | | | |
|---|---|---|---|---|
| 2,997,247 A * | 8/1961 | McGuire | ................ | G06K 13/26 242/352.2 |
| 5,749,533 A * | 5/1998 | Daniels | ................ | F16D 57/002 242/287 |
| 2010/0018823 A1 * | 1/2010 | Melz | ...................... | F16D 28/00 192/99 B |
| 2020/0378370 A1 * | 12/2020 | Köpfer | .................... | F03G 7/065 |

* cited by examiner

*Primary Examiner* — Hoang M Nguyen
(74) *Attorney, Agent, or Firm* — Birch, Stewart, Kolasch & Birch, LLP

(57) ABSTRACT

Provided are an actuation apparatus and an actuation method that belong to the field of actuation apparatus technology. The actuation apparatus includes a support seat, a swing arm, an braking arm, an elastic member, a first shape memory alloy line, and a second shape memory alloy line. The swing arm is mounted on the support seat and rotatable about a swing axis. The swing arm is provided with a first force-bearing portion, an execution portion, and an braking portion. The distance from the first force-bearing portion to the swing axis is shorter than the distance from the execution portion to the swing axis. The braking arm is movably mounted on the support seat. The elastic member is clamped between the support seat and the braking arm and configured to drive the braking arm to stop against the braking portion.

10 Claims, 4 Drawing Sheets

ACTUATION APPARATUS AND ACTUATION METHOD

CROSS-REFERENCE TO RELATED APPLICATION

This application claims priority to Chinese Patent Application No. 202410808464.9 filed Jun. 21, 2024, the disclosure of which is incorporated herein by reference in its entirety.

TECHNICAL FIELD

The present invention relates to the field of actuation apparatus technology and, in particular, to an actuation apparatus and an actuation method.

BACKGROUND

A shape memory alloy (SMA) is an alloy that may return to the shape before deformation when heated. A shape memory alloy line is a line made of a shape memory alloy. When in use, the shape memory alloy line is powered on to generate Joule heat to implement the deformation of the shape memory alloy line. Compared with traditional electromechanical, hydraulic and pneumatic apparatus, an actuation apparatus using the shape memory alloy line has the advantages of simple structure, high energy density, low noise, stability and reliability and can be widely used in fields such as bionic robots, microelectromechanical systems, and aerospace.

However, the execution strain of the shape memory alloy line is relatively small. When applied to the actuation apparatus, the shape memory alloy line is difficult to generate a relatively large actuation stroke in the limited space. To obtain a relatively large stroke, the length of the shape memory alloy line must be increased, which, however, not only increases the structural complexity of the actuation apparatus but also occupies more space. Moreover, a longer shape memory alloy line often leads to a slower response speed. Additionally, the shape memory alloy line can be made into a spring to increase the actuation stroke. However, such an arrangement may reduce the driving force value of the actuation apparatus. The stiffness of the spring is small, also reducing the response speed. In addition, in the actuation apparatus, to maintain the actuation stroke, the shape memory alloy line needs to be continuously energized, resulting in high energy consumption.

SUMMARY

An object of the present invention is to provide an actuation apparatus and an actuation method that can efficiently improve and maintain an actuation stroke on the basis of guaranteeing the response speed.

To achieve this object, the present invention adopts the technical solutions below.

The actuation apparatus includes a support seat, a swing arm, an braking arm, an elastic member, a first shape memory alloy line, and a second shape memory alloy line.

The swing arm is mounted on the support seat and rotatable about a swing axis. The swing arm is provided with a first force-bearing portion, an execution portion, and an braking portion. A distance from the first force-bearing portion to the swing axis is shorter than a distance from the execution portion to the swing axis.

The braking arm is movably mounted on the support seat.

The elastic member is clamped between the support seat and the braking arm and configured to drive the braking arm to stop against the braking portion.

The first shape memory alloy line is disposed on the support seat. When powered on and working, the first shape memory alloy line is able to drive the first force-bearing portion to rotate around the swing axis.

The second shape memory alloy line is disposed on the support seat. When powered on and working, the second shape memory alloy line is able to drive the braking arm away from the braking portion.

Preferably, two first shape memory alloy lines are provided. Each of the two first shape memory alloy lines is provided with one first force-bearing portion. When powered on and working, the two first shape memory alloy lines are able to drive the swing arm to rotate in an opposite direction.

Preferably, the execution portion is located on one side of the swing axis, and two first force-bearing portions are located on another side of the swing axis.

Preferably, the execution portion and one first force-bearing portion are located on one side of the swing axis, and another first force-bearing portion is located on another side of the swing axis.

Preferably, the first force-bearing portion is a protrusion head structure. The first shape memory alloy line is wound around the first force-bearing portion.

Preferably, the braking arm is rotatably mounted on the support seat.

Preferably, the first shape memory alloy line and the second shape memory alloy line are located on two sides of a thickness direction of the braking arm.

Preferably, a partition plate is disposed on the support seat, and a clip of the first shape memory alloy line and a clip of the second shape memory alloy line are located on two sides of the partition plate.

Preferably, a plurality of first shape memory alloy lines are provided and are divided into multiple grades. Deformation amounts of any two grades of first shape memory alloy lines, among the plurality of first shape memory alloy lines, when powered on and working, are different.

An actuation method is provided. The actuation method uses the preceding actuation apparatus and includes the following.

A second shape memory alloy line is powered on to work to drive an braking arm away from an braking portion.

A first shape memory alloy line is powered on to work to drive a first force-bearing portion to rotate around a swing axis and drive an execution portion to move to a set position.

The second shape memory alloy line is powered off, and an elastic member drives the braking arm to abut against the braking portion.

The present invention has the beneficial effects below.

The swing arm is disposed on the support seat, and the distance from the first force-bearing portion on the swing arm to the swing axis is shorter than the distance from the execution portion to the swing axis. In this case, when the first shape memory alloy line drives the swing arm to move, an actuation stroke is effectively improved on the basis of guaranteeing the driving force value and the response speed. The elastic member drives the braking arm to stop against the braking portion to stop the swing arm so that the swing arm can achieve zero retention energy, efficiently maintaining the actuation stroke. The second shape memory alloy line is powered on only when the braking is released so that the second shape memory alloy line drives the braking arm away from the braking portion.

Figure 1:
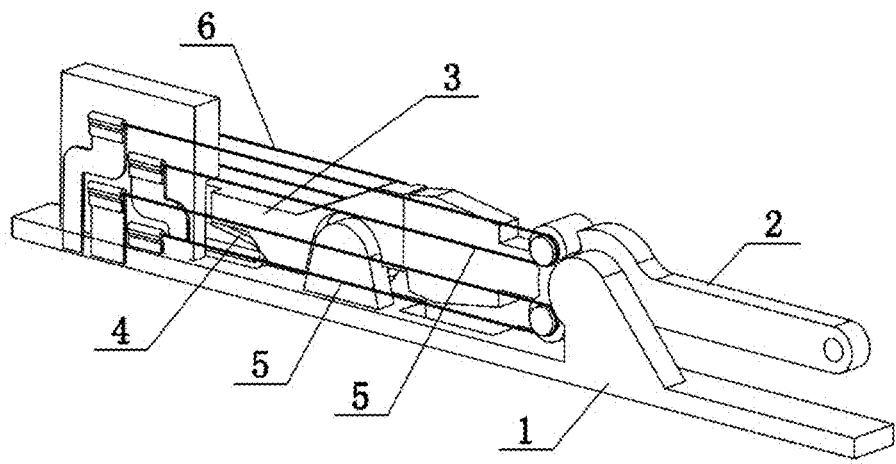
FIG. 1 is a structural view of an actuation apparatus according to embodiment one of the present invention.

REFERENCE LIST 1 support seat 11 partition plate
2 swing arm 21 first force-bearing portion 22 execution portion 23 braking portion
3 braking arm 31 second force-bearing portion
4 elastic member
5 first shape memory alloy line
6 second shape memory alloy line

DETAILED DESCRIPTION

Embodiments of the present invention are described in detail below. Examples of the embodiments are illustrated in the drawings, where the same or similar reference numerals indicate the same or similar components or components having the same or similar functions. The embodiments described hereinafter with reference to the drawings are merely exemplary. The embodiments are intended to explain the present invention and are not to be construed as limiting the present invention.

In the description of the present invention, unless otherwise expressly specified and limited, the term "connected to each other", "connected", or "fixed" is to be construed in a broad sense, for example, as fixedly connected or detachably connected; mechanically connected or electrically connected; directly connected to each other or indirectly connected to each other via an intermediary; or internally connected or interactional between two elements. For those of ordinary skill in the art, specific meanings of the preceding terms in the present invention may be understood based on specific situations.

In the description of the present invention, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above", or "over" the second feature, the first feature is right on, above, or over the second feature, the first feature is obliquely on, above, or over the second feature, or the first feature is simply at a higher level than the second feature. When the first feature is described as "under", "below", or "underneath" the second feature, the first feature is right under, below, or underneath the second feature, the first feature is obliquely under, below, or underneath the second feature, or the first feature is simply at a lower level than the second feature.

Technical solutions of the present invention are further described hereinafter in conjunction with the drawings and the embodiments.

Embodiment One

Figure 2:
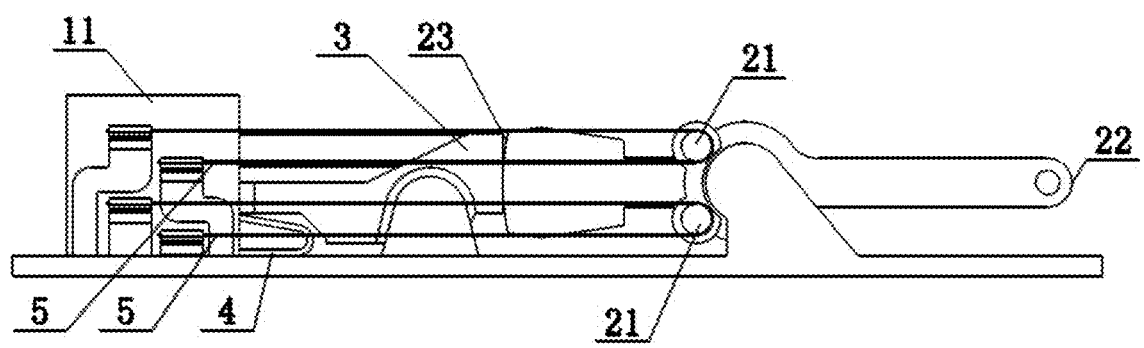
FIG. 2 is a front view of the actuation apparatus according to embodiment one of the present invention.
Figure 3:
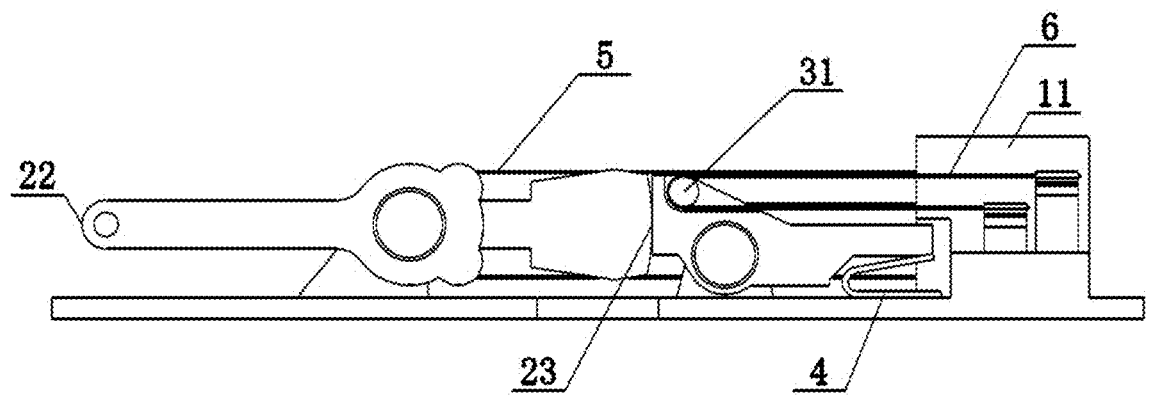
FIG. 3 is a rear view of the actuation apparatus according to embodiment one of the present invention.

As shown in FIGS. 1 to 3, this embodiment provides an actuation apparatus. The actuation apparatus includes a support seat 1, a swing arm 2, an braking arm 3, an elastic member 4, a first shape memory alloy line 5, and a second shape memory alloy line 6. The swing arm 2 is mounted on the support seat 1 and is rotatable about a swing axis. The swing arm 2 is provided with a first force-bearing portion 21, an execution portion 22, and an braking portion 23. The distance from the first force-bearing portion 21 to the swing axis is shorter than the distance from the execution portion 22 to the swing axis. The braking arm 3 is movably mounted on the support seat 1. The elastic member 4 is clamped between the support seat 1 and the braking arm 3 and configured to drive the braking arm 3 to stop against the braking portion 23. The first shape memory alloy line 5 and the second shape memory alloy line 6 are disposed on the support seat 1. When powered on and working, the first shape memory alloy line 5 is able to drive the first force-bearing portion 21 to rotate around the swing axis. When powered on and working, the second shape memory alloy line 6 is able to drive the braking arm 3 away from the braking portion 23.

In the present invention, the swing arm 2 is disposed on the support seat 1, and the distance from the first force-bearing portion 21 on the swing arm 2 to the swing axis is shorter than the distance from the execution portion 22 to the swing axis. In this case, when the first shape memory alloy line 5 drives the swing arm 2 to move, an actuation stroke is effectively improved on the basis of guaranteeing the driving force value and the response speed. The elastic member 4 drives the braking arm 3 to stop against the braking portion 23 to stop the swing arm 2 so that the swing arm 2 can achieve zero retention energy, efficiently maintaining the actuation stroke. The second shape memory alloy line 6 is powered on only when the braking is released so that the second shape memory alloy line 6 drives the braking arm 3 away from the braking portion 23.

Specifically, two first shape memory alloy lines 5 are provided. Each first shape memory alloy line 5 is provided with one first force-bearing portion 21. When powered on and working, the two first shape memory alloy lines 5 are able to drive the swing arm 2 to rotate in an opposite direction. In the preceding arrangement, the two first shape memory alloy lines 5 match to drive the execution portion 22 of the swing arm 2 to generate strokes in both positive and negative directions so that each actuation stroke is further improved.

More specifically, the execution portion 22 is located on one side of the swing axis. Two first force-bearing portions 21 are located on the other side of the swing axis. The preceding arrangement enables the execution portion 22 to be located on one side of the swing axis of the swing arm 2 independently and be more flexible.

Specifically, a first force-bearing portion 21 is a protrusion head structure. A respective first shape memory alloy line 5 is wound around the first force-bearing portion 21. The preceding arrangement enables the first shape memory alloy line 5 to apply a force to the first force-bearing portion 21.

More specifically, a winding groove is disposed on the protrusion head of the first force-bearing portion 21. The first shape memory alloy line 5 is inserted into the winding groove, thus preventing the first shape memory alloy line 5 from detaching from the first force-bearing portion 21.

In this embodiment, the first force-bearing portion 21 is a circular or square protrusion column, with an axis parallel to the swing axis of the swing arm 2. Two clips matching the first shape memory alloy line 5 are disposed on the support seat 1 and located on one side of the swing axis facing away from the execution portion 22. Two ends of the first shape memory alloy line 5 are connected to the two clips respectively. After the first shape memory alloy line 5 is wound around the first force-bearing portion 21, two segments of the first shape memory alloy line 5 are parallel to each other.

In other embodiments, the first force-bearing portion 21 may also be an insertion and assembly channel disposed on the swing arm 2, making the assembly more secure. In this case, the first shape memory alloy line 5 inserted in the first force-bearing portion 21 is difficult to detach from the swing arm 2.

Specifically, the execution portion 22 is disposed on one end of the swing arm 2. The braking portion 23 is disposed on the other end of the swing arm 2. The first force-bearing portion 21 is located between the braking portion 23 and the swing axis.

In this embodiment, a straight rod is disposed on one end of the swing arm 2, and a block is disposed on the other end of the swing arm 2. The sectional area of the straight rod is less than the sectional area of the block. The execution portion 22 is disposed on the straight rod, making the movement more flexible. A through hole is disposed on the straight rod, which is convenient for connecting and assembling other components. The braking portion 23 is disposed on an end face of the block, having a greater area and being more reliable when getting braked by force.

Specifically, a second force-bearing portion 31 is disposed on the braking arm 3. When powered on and working, the second shape memory alloy line 6 can drive the second force-bearing portion 31. The preceding arrangement enables the second shape memory alloy line 6 to apply a force to the braking arm 3.

More specifically, the second force-bearing portion 31 is a protrusion head structure. The second shape memory alloy line 6 is wound around the second force-bearing portion 31. The preceding arrangement enables the transmission of the acting force between the second shape memory alloy line 6 and the braking arm 3 to be more stable and reliable.

More specifically, a winding groove is disposed on the protrusion head of the second force-bearing portion 31. The second shape memory alloy line 6 is inserted into the winding groove, thus preventing the second shape memory alloy line 6 from detaching from the second force-bearing portion 31.

In this embodiment, the second force-bearing portion 31 is a circular or square protrusion column, with an axis parallel to the axis of the first force-bearing portion 21. Two clips matching the second shape memory alloy line 6 are disposed on the support seat 1 and located on one side of the swing axis facing away from the execution portion 22. Two ends of the second shape memory alloy line 6 are connected to the two clips respectively. After wound around the second force-bearing portion 31, two segments of the second shape memory alloy line 6 are parallel to each other.

In other embodiments, the second force-bearing portion 31 may also be an insertion and assembly channel disposed on the swing arm 2, making the assembly more secure. In this case, the second shape memory alloy line 6 inserted in the second force-bearing portion 31 is difficult to detach from the braking arm 3.

Specifically, the braking arm 3 is rotatably mounted on the support seat 1 so that the abutment and actuation of the braking arm 3 to the braking portion 23 of the swing arm 2 is more secure and reliable.

In this embodiment, the elastic member 4 is a spring contact or a spring abutting against and acting on one end of the braking arm 3. The other end of the braking arm 3 is used for abutting against and locking the braking portion 23.

In other embodiments, the braking arm 3 may also be slidably mounted on the support seat 1. The elastic member 4 drives the braking arm 3 to move towards the braking portion 23 to actuate the swing arm 2. The second shape memory alloy line 6 drives the braking arm 3 to move away from the braking portion 23 to release the braking to the swing arm 2.

Specifically, the first shape memory alloy line 5 and the second shape memory alloy line 6 are located on two sides of the thickness direction of the braking arm 3. The preceding arrangement avoids the mutual effect and interference between the first shape memory alloy line 5 and the second shape memory alloy line 6.

More specifically, a partition plate 11 is disposed on the support seat 1. A clip of the first shape memory alloy line 5 and a clip of the second shape memory alloy line 6 are located on two sides of the partition plate 11. The preceding arrangement makes the first shape memory alloy line 5 and the second shape memory alloy line 6 more secure when powered on and working.

Figure 4:
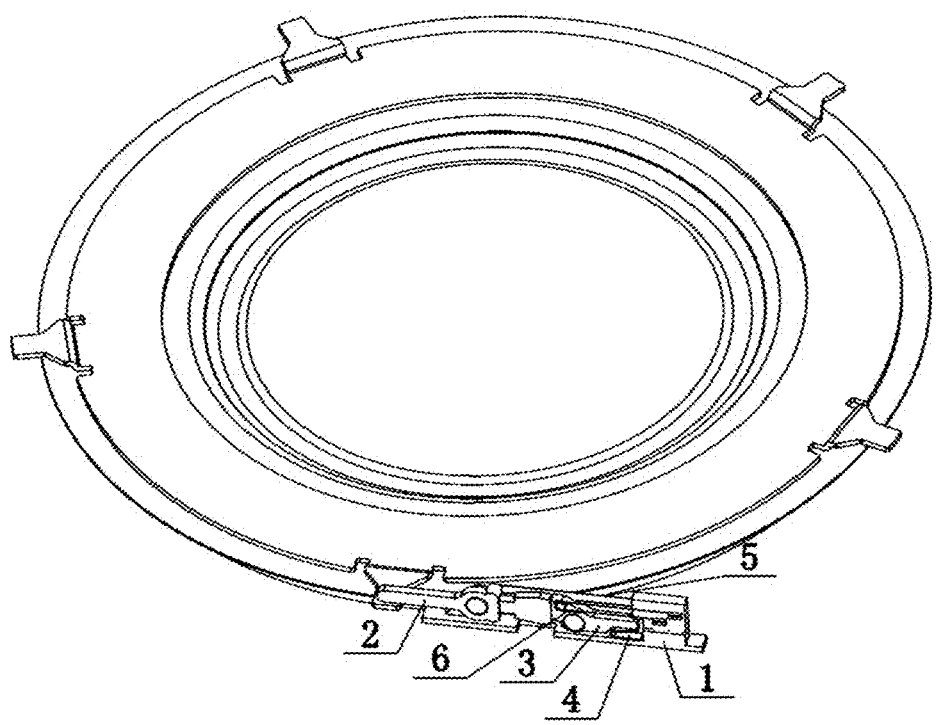
FIG. 4 is a structural view of the actuation apparatus applied to an optical assembly according to embodiment one of the present invention.
Figure 5:
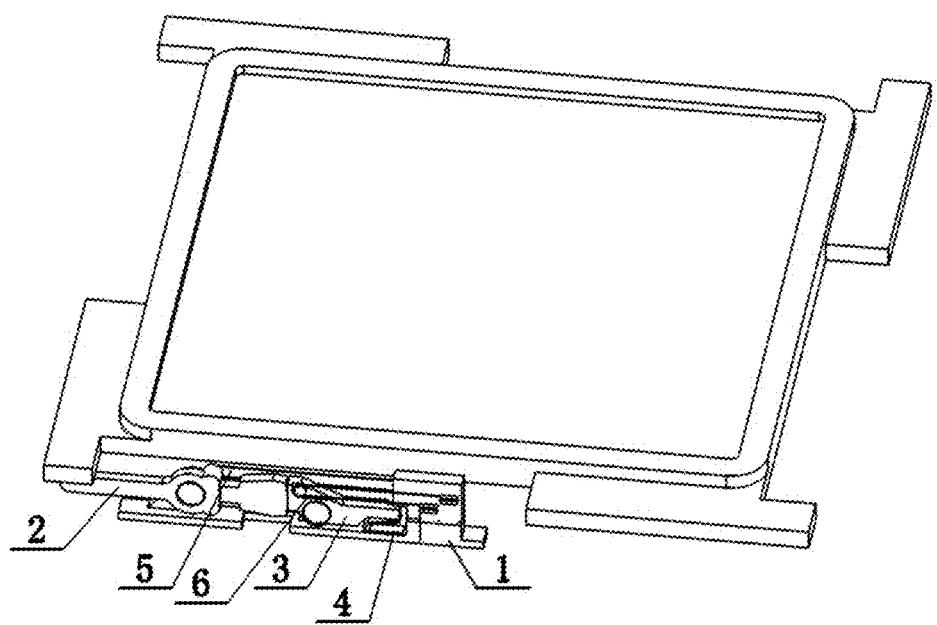
FIG. 5 is a structural view of the actuation apparatus applied to a display assembly according to embodiment one of the present invention.

The actuation apparatus in this embodiment can be applied in fields such as Augmented Reality (AR), Virtual Reality (VR), and cameras, can drive an optical assembly to change the focus as shown in FIG. 4, and can drive a display module to perform displacement as shown in FIG. 5.

Embodiment Two

Figure 6:
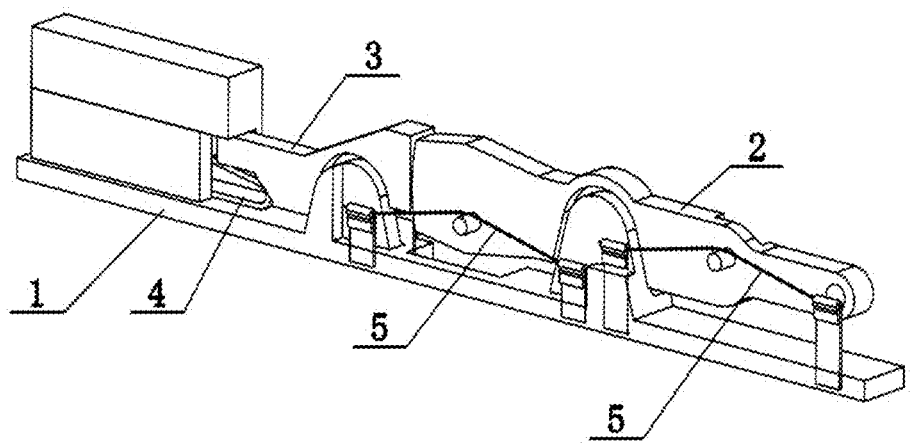
FIG. 6 is a structural view of an actuation apparatus according to embodiment two of the present invention.
Figure 7:
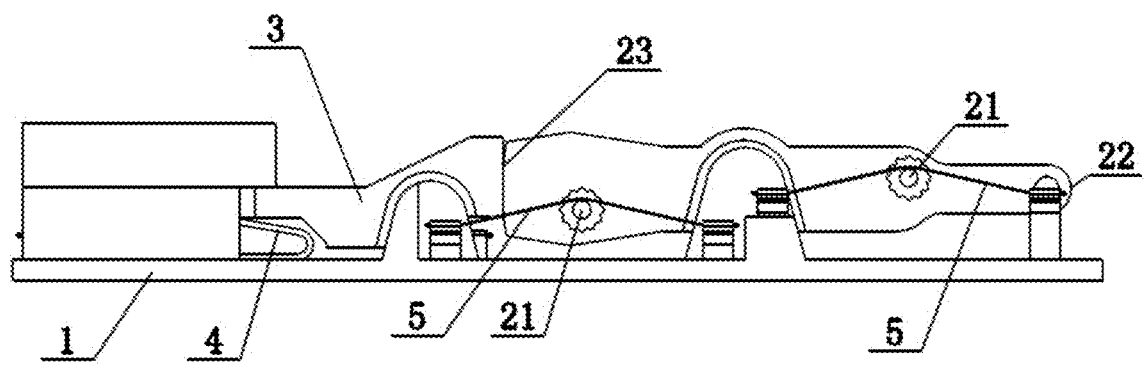
FIG. 7 is a front view of the actuation apparatus according to embodiment two of the present invention.
Figure 8:
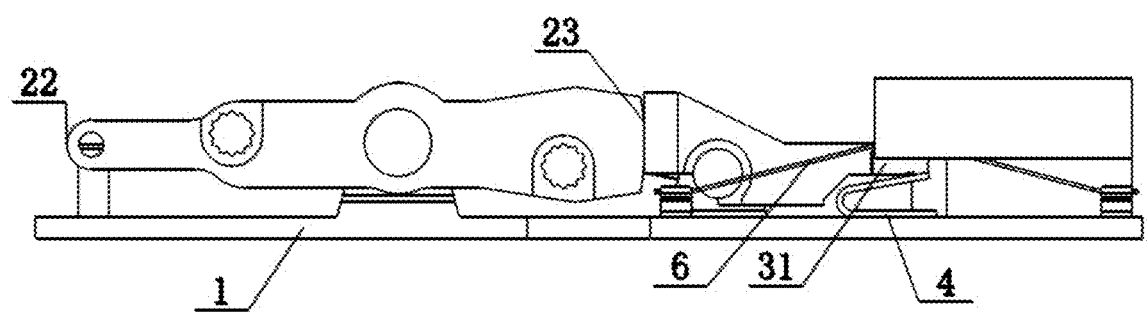
FIG. 8 is a rear view of the actuation apparatus according to embodiment two of the present invention.

As shown in FIGS. 6 to 8, this embodiment provides an actuation apparatus. Components of this embodiment the same as or corresponding to those of embodiment one use the corresponding reference numerals or names in embodiment one. For simplicity, only differences between this embodiment and embodiment one are described hereinafter.

The difference between this embodiment and embodiment one lies in that the execution portion 22 and one first force-bearing portion 21 are located on one side of the swing axis and that the other first force-bearing portion 21 is located on the other side of the swing axis. In this embodiment, the two first force-bearing portions 21 are located on two sides of the swing axis of the swing arm 2, avoiding the stacking in the vertical direction and saving the occupied space.

More specifically, the two clips matching the first shape memory alloy line 5 are disposed on the support seat 1 and located on two sides of the corresponding first force-bearing portion 21. Two ends of the first shape memory alloy line 5 are connected to the two clips respectively. After the first shape memory alloy line 5 is wound around the first force-bearing portion 21, an included angle between the two segments of the first shape memory alloy line 5 is greater than 90°.

In this embodiment, the two clips matching the second shape memory alloy line 6 are disposed on the support seat 1 and located on two sides of the corresponding second force-bearing portion 31. Two ends of the second shape memory alloy line 6 are connected to the two clips respectively. After the second shape memory alloy line 6 is wound around the second force-bearing portion 31, an included angle between the two segments of the second shape memory alloy line 6 is greater than 90°.

Embodiment Three

This embodiment provides an actuation apparatus. Components of this embodiment the same as or corresponding to those of embodiment one use the corresponding reference numerals or names in embodiment one. For simplicity, only differences between this embodiment and embodiment one are described hereinafter.

The difference between this embodiment and embodiment one lies in that a plurality of first shape memory alloy lines 5 are provided and are divided into multiple grades and that deformation amounts of any two grades of first shape memory alloy lines 5 when powered on and working are different. The preceding arrangement enables the execution portion 22 to have multiple set actuation strokes.

In this embodiment, among the first shape memory alloy lines 5 in multiple grades, each grade is provided with two first shape memory alloy lines 5. When powered on and working, two first shape memory alloy lines 5 in each grade can drive the swing arm 2 to rotate in an opposite direction. In the preceding configuration, two first shape memory alloy lines 5 in each grade match to drive the execution portion 22 of the swing arm 2 to generate strokes in both positive and negative directions so that each actuation stroke is further improved.

The first shape memory alloy lines 5 in multiple grades may have the same size and specification but be made of different materials, or may have different sizes and specifications but be made of the same material so that when powered on and working, the first shape memory alloy lines 5 have different deformation amounts. The preceding sizes and specifications refer to line diameters and line lengths.

As shown in the table below, a first shape memory alloy line 5 made of Ni—Ti and a first shape memory alloy line 5 made of Ni—Ti—Cu are taken for example to describe maximum tensile forces and maximum deformation amounts of each first shape memory alloy wire 5 in different sizes and specifications.

| Alloy Line material | Line Diameter (μm) | Line length (mm) | Maximum Tensile Force (gf) | Maximum Deformation Amount (mm) |
|---|---|---|---|---|
| Ni-Ti | 50 | 15 | 60 | 0.75 |
| | 50 | 20 | 60 | 1 |
| | 100 | 15 | 200 | 0.75 |
| | 100 | 20 | 200 | 1 |
| Ni-Ti-Cu | 50 | 15 | 80 | 0.75 |
| | 50 | 20 | 80 | 1 |
| | 100 | 15 | 280 | 0.75 |
| | 100 | 20 | 280 | 1 |

This embodiment provides an actuation method using the actuation apparatus in any preceding embodiment. The actuation method includes the following.

The second shape memory alloy line 6 is powered on to work to drive the braking arm 3 away from the braking portion 23.

The first shape memory alloy line 5 is powered on to work to drive the first force-bearing portion 21 to rotate around the swing axis and drive the execution portion 22 to move to a set position.

The second shape memory alloy line 6 is powered off, and the elastic member 4 drives the braking arm 3 to abut against the braking portion 23.

In the actuation method in this embodiment, the swing arm 2 is disposed on the support seat 1, and the distance from the first force-bearing portion 21 on the swing arm 2 to the swing axis is shorter than the distance from the execution portion 22 to the swing axis. In this case, when the first shape memory alloy lines 5 drive the swing arm 2 to move, an actuation stroke is effectively improved on the basis of guaranteeing the driving force value and the response speed. The elastic member 4 drives the braking arm 3 to stop against the braking portion 23 to stop the swing arm 2 so that the swing arm 2 can achieve zero retention energy, efficiently maintaining the actuation stroke. The second shape memory alloy line 6 is powered on only when the actuation is released so that the second shape memory alloy line 6 drives the braking arm 3 away from the braking portion 23.

Figure 9:
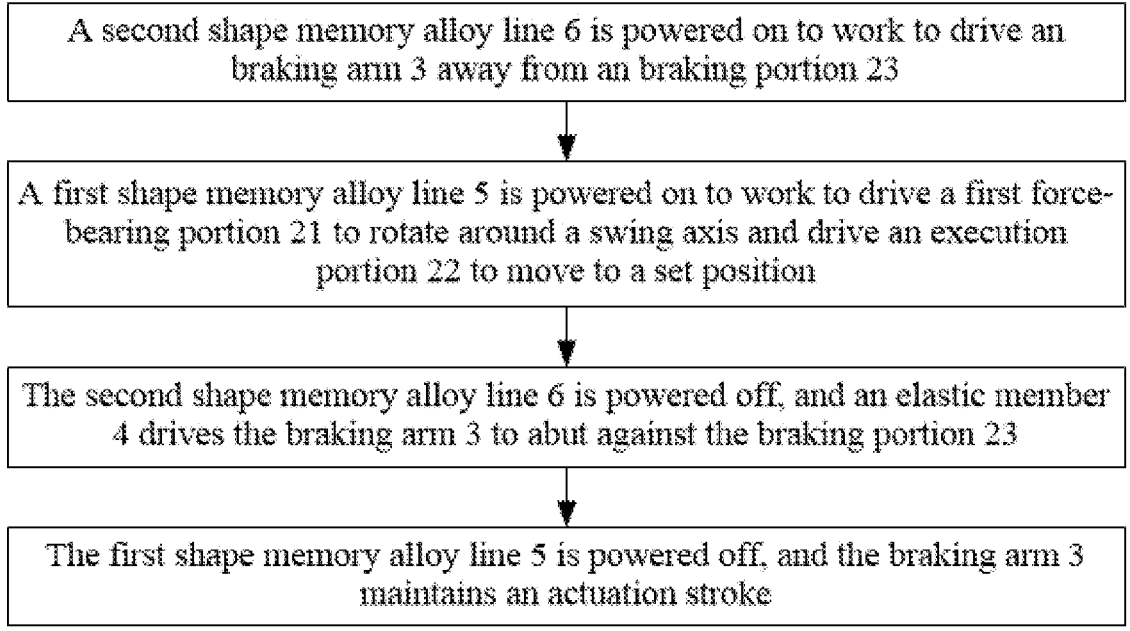
FIG. 9 is a flowchart of an actuation method according to an embodiment of the present invention.

As shown in FIG. 9, based on the specific structure of the actuation apparatus, the actuation method in this embodiment specifically includes the steps below.

In step one, the second shape memory alloy line 6 is powered on to work to drive the braking arm 3 away from the braking portion 23.

In this step, when the temperature of the second shape memory alloy line 6 is raised after the second shape memory alloy line 6 is powered on, the length of the second shape memory alloy line 6 is shortened, pulling the second force-bearing portion 31. In this case, the braking arm 3 compresses the elastic member 4, releasing the braking to the swing arm 2. Finally the swing arm 2 is in a free state.

In step two, the first shape memory alloy line 5 is powered on to work to drive the first force-bearing portion 21 to rotate around the swing axis and drive the execution portion 22 to move to the set position.

In this step, according to needs, when the temperature of one first shape memory alloy line 5 is raised after the first shape memory alloy line 5 is powered on, the length of the first shape memory alloy line 5 is shortened, pulling a first force-bearing portion 21 corresponding to the first shape memory alloy line 5. In this case, the swing arm 2 rotates until the execution portion 22 on the swing arm 2 reaches the set position.

In step three, the second shape memory alloy line 6 is powered off, and the elastic member 4 drives the braking arm 3 to abut against the braking portion 23.

In this step, the second shape memory alloy line 6 is powered off. The length of the second shape memory alloy line 6 is restored. The elastic member 4 drives the braking arm 3 to rotate until the braking arm 3 abuts against the braking portion 23 on the swing arm 2. In this case, the swing arm 2 is in an brake-locking state.

In step four, the first shape memory alloy line 5 is powered off, and the braking arm 3 maintains an actuation stroke.

Apparently, the preceding embodiments of the present invention are only illustrative of the present invention and are not intended to limit embodiments of the present invention. Those of ordinary skill in the art can make changes or variations in other different forms based on the preceding description. All embodiments cannot be and do not need to be exhausted herein. Any modifications, equivalent substitutions and improvements made within the spirit and principle of the present invention fall within the scope of the claims of the present invention.

What is claimed is:

1. An actuation apparatus, comprising:
   a support seat;
   a swing arm mounted on the support seat and rotatable about a swing axis, wherein the swing arm is provided with at least one first force-bearing portion, an execution portion, and a braking portion; and a distance from the at least one first force-bearing portion to the swing axis is shorter than a distance from the execution portion to the swing axis;
   a braking arm movably mounted on the support seat;
   an elastic member clamped between the support seat and the braking arm and configured to drive the braking arm to stop against the braking portion;
   at least one first shape memory alloy line disposed on the support seat, wherein when powered on and working, the at least one first shape memory alloy line is able to drive the at least one first force-bearing portion to rotate around the swing axis; and
   a second shape memory alloy line disposed on the support seat, wherein when powered on and working, the second shape memory alloy line is able to drive the braking arm away from the braking portion.

2. The actuation apparatus according to claim 1, wherein the at least one first shape memory alloy line comprises two first shape memory alloy lines; each of the two first shape memory alloy lines is provided with one first force-bearing portion; and when powered on and working, the two first shape memory alloy lines are able to drive the swing arm to rotate in an opposite direction.

3. The actuation apparatus according to claim 2, wherein the at least one first force-bearing portion comprises two first force-bearing portions, the execution portion is located on one side of the swing axis, and the two first force-bearing portions are located on another side of the swing axis.

4. The actuation apparatus according to claim 2, wherein the execution portion and one of the two first force-bearing portion are located on one side of the swing axis, and the other of the two first force-bearing portion is located on another side of the swing axis.

5. The actuation apparatus according to claim 1, wherein the at least one first force-bearing portion is a protrusion head structure, and the at least one first shape memory alloy line is wound around the first force-bearing portion.

6. The actuation apparatus according to claim 1, wherein the braking arm is rotatably mounted on the support seat.

7. The actuation apparatus according to claim 1, wherein the at least one first shape memory alloy line and the second shape memory alloy line are respectively located on two sides of a thickness direction of the braking arm.

8. The actuation apparatus according to claim 7, wherein a partition plate is disposed on the support seat, and a clip of the at least one first shape memory alloy line and a clip of the second shape memory alloy line are located on two sides of the partition plate.

9. The actuation apparatus according to claim 1, wherein the at least one first shape memory alloy line comprises a plurality of first shape memory alloy lines which are divided into a plurality of grades; and deformation amounts of any two grades of first shape memory alloy lines, among the plurality of first shape memory alloy lines, when powered on and working, are different.

10. An actuation method, using the actuation apparatus according to claim 1 and comprising:
   powering on the second shape memory alloy line to work to drive the braking arm away from the braking portion;
   powering on the at least one first shape memory alloy line to work to drive the at least one first force-bearing portion to rotate around the swing axis and drive the execution portion to move to a set position; and
   powering off the second shape memory alloy line and driving, by the elastic member, the braking arm to abut against the braking portion.

* * * * *